United States Patent
Maes

(10) Patent No.: US 8,230,449 B2
(45) Date of Patent: *Jul. 24, 2012

(54) CALL CONTROL ENABLER ABSTRACTED FROM UNDERLYING NETWORK TECHNOLOGIES

(75) Inventor: Stéphane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 1231 days.

This patent is subject to a terminal disclaimer.

(21) Appl. No.: 11/949,930

(22) Filed: Dec. 4, 2007

(65) Prior Publication Data

US 2008/0288966 A1    Nov. 20, 2008

Related U.S. Application Data

(60) Provisional application No. 60/896,676, filed on Mar. 23, 2007.

(51) Int. Cl.
G06F 9/44 (2006.01)
G06F 7/04 (2006.01)

(52) U.S. Cl. ........ 719/328; 709/223

(58) Field of Classification Search .......... 719/328; 709/204

See application file for complete search history.

(56) References Cited

U.S. PATENT DOCUMENTS

| | | | |
|---|---|---|---|
| 5,414,812 A | 5/1995 | Filip et al. | |
| 5,699,513 A | 12/1997 | Feigen et al. | |
| 5,786,770 A | 7/1998 | Thompson | |
| 5,850,517 A | 12/1998 | Verkler et al. | |
| 5,867,665 A | 2/1999 | Butman et al. | |
| 6,115,690 A | 9/2000 | Wong | |
| 6,119,104 A | 9/2000 | Brumbelow | |
| 6,128,645 A | 10/2000 | Butman et al. | |
| 6,157,941 A | 12/2000 | Verkler et al. | |
| 6,163,800 A | 12/2000 | Ejiri | |
| 6,230,271 B1 | 5/2001 | Wadlow et al. | |

(Continued)

FOREIGN PATENT DOCUMENTS

EP    2 034 748 A1    3/2009

(Continued)

OTHER PUBLICATIONS

Maretzke, Michael, "JAIN SLEE Technology Overview," Apr. 12, 2005, 26 pages.

(Continued)

*Primary Examiner* — Andy Ho
*Assistant Examiner* — Abdou Seye
(74) *Attorney, Agent, or Firm* — Kilpatrick, Townsend & Stockton LLP

(57) ABSTRACT

Embodiments of the invention provide systems and methods for controlling a media session. According to one embodiment, a method for controlling a communication session can comprise receiving a request to perform a call control function from an application via a northbound interface of a call control enabler. The northbound interface can provide an abstract interface for invoking one or more of a plurality of call control functions. The call control function can be requested from a first network resource via a southbound interface of the call control enabler specific to the first network resource. In some cases, results of the call control function can be received from the first network resource via the southbound interface of the call control enabler. The results of the call control function can then be returned to the application via the northbound interface of the call control enabler.

42 Claims, 6 Drawing Sheets

U.S. PATENT DOCUMENTS

| | | |
|---|---|---|
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,748,570 B1 | 6/2004 | Bahrs et al. |
| 6,792,605 B1 | 9/2004 | Roberts et al. |
| 6,868,413 B1 | 3/2005 | Grindrod et al. |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,073,055 B1 | 7/2006 | Freed et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,334 B2 | 5/2007 | Casati et al. |
| 7,272,625 B1 | 9/2007 | Hannel et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,447,793 B2 | 11/2008 | Morioka |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,676,813 B2 | 3/2010 | Bisset et al. |
| 7,716,310 B2 | 5/2010 | Foti |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,873,716 B2 | 1/2011 | Maes |
| 7,925,727 B2 * | 4/2011 | Sullivan et al. ............... 709/223 |
| 8,032,920 B2 | 10/2011 | Maes |
| 8,073,810 B2 | 12/2011 | Maes |
| 8,090,848 B2 | 1/2012 | Maes |
| 2001/0028649 A1 * | 10/2001 | Pogossiants et al. ......... 370/389 |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benatar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0131076 A1 | 7/2003 | Nelson et al. |
| 2003/0140131 A1 | 7/2003 | Chandrashekhar et al. |
| 2003/0154233 A1 | 8/2003 | Patterson |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0110493 A1 | 6/2004 | Alvarez et al. |
| 2004/0128546 A1 | 7/2004 | Blakley et al. |
| 2004/0139319 A1 | 7/2004 | Favazza et al. |
| 2004/0153545 A1 | 8/2004 | Pandaya et al. |
| 2004/0161090 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0072474 A1 | 4/2006 | Mitchell |
| 2006/0080117 A1 | 4/2006 | Carr et al. |
| 2006/0104306 A1 * | 5/2006 | Adamczyk et al. ............ 370/466 |
| 2006/0104431 A1 | 5/2006 | Emery et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0061397 A1 | 3/2007 | Gregorat et al. |
| 2007/0088836 A1 | 4/2007 | Tai et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0118618 A1 | 5/2007 | Kisel et al. |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |

| | | | |
|---|---|---|---|
| 2008/0025243 | A1 | 1/2008 | Corneille et al. |
| 2008/0080479 | A1 | 4/2008 | Maes |
| 2008/0109853 | A1 | 5/2008 | Einarsson et al. |
| 2008/0127232 | A1 | 5/2008 | Langen et al. |
| 2008/0151768 | A1 | 6/2008 | Liu |
| 2008/0151918 | A1 | 6/2008 | Foti |
| 2008/0162637 | A1* | 7/2008 | Adamczyk et al. ........... 709/204 |
| 2008/0168523 | A1 | 7/2008 | Ansari et al. |
| 2008/0186845 | A1 | 8/2008 | Maes |
| 2008/0189401 | A1 | 8/2008 | Maes |
| 2008/0228919 | A1 | 9/2008 | Doshi et al. |
| 2008/0232567 | A1 | 9/2008 | Maes |
| 2008/0235230 | A1 | 9/2008 | Maes |
| 2008/0235327 | A1 | 9/2008 | Maes et al. |
| 2008/0235354 | A1 | 9/2008 | Maes |
| 2008/0235380 | A1 | 9/2008 | Maes |
| 2008/0275883 | A1 | 11/2008 | Ashraf et al. |
| 2008/0301135 | A1 | 12/2008 | Alves et al. |
| 2008/0307108 | A1 | 12/2008 | Yan et al. |
| 2009/0006360 | A1 | 1/2009 | Liao et al. |
| 2009/0015433 | A1 | 1/2009 | James et al. |
| 2009/0034426 | A1 | 2/2009 | Luft et al. |
| 2009/0112875 | A1 | 4/2009 | Maes |
| 2009/0119303 | A1 | 5/2009 | Rio et al. |
| 2009/0125595 | A1 | 5/2009 | Maes |
| 2009/0132717 | A1 | 5/2009 | Maes |
| 2009/0187919 | A1 | 7/2009 | Maes |
| 2009/0190603 | A1 | 7/2009 | Damola et al. |
| 2009/0193057 | A1 | 7/2009 | Maes |
| 2009/0193433 | A1 | 7/2009 | Maes |
| 2009/0201917 | A1 | 8/2009 | Maes et al. |
| 2009/0228584 | A1 | 9/2009 | Maes et al. |
| 2009/0306834 | A1 | 12/2009 | Hjelm et al. |
| 2009/0328051 | A1 | 12/2009 | Maes |
| 2010/0049640 | A1 | 2/2010 | Maes |
| 2010/0049826 | A1 | 2/2010 | Maes |
| 2010/0058436 | A1 | 3/2010 | Maes |
| 2010/0077082 | A1 | 3/2010 | Hession et al. |
| 2011/0125909 | A1 | 5/2011 | Maes |
| 2011/0125913 | A1 | 5/2011 | Maes |
| 2011/0126261 | A1 | 5/2011 | Maes |
| 2011/0134804 | A1 | 6/2011 | Maes |
| 2011/0142211 | A1 | 6/2011 | Maes |
| 2011/0145278 | A1 | 6/2011 | Maes |
| 2011/0182205 | A1 | 7/2011 | Gerdes et al. |

FOREIGN PATENT DOCUMENTS

| | | | |
|---|---|---|---|
| WO | WO 2007134468 | A1 | 11/2007 |

OTHER PUBLICATIONS

O'Doherty, Phelim, "JSLEE—SIP Servlet", SIPServlet.pdf, 2003, 13 pages.
The Parlay Group, "Specifications", Jan. 14, 2005, 2 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.
U.S. Appl. No. 11/357,653, filed Feb. 16, 200, Office Action dated Jan. 20, 2011, 18 pages.
Wikipedia, "Parlay", Jan. 30, 2005, 3 pages.
Wikipedia, "Object-Oriented Programming", Dec. 11, 2005, 10 pages.
Wikipedia, "OSI model", Sep. 7, 2005, 8 pages.
U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action mailed Mar. 17, 2011, 21 pages.
U.S. Appl. No. 11/848,347, filed Aug. 31, 2007, Office Action mailed Oct. 29, 2009, 12 pages.
U.S. Appl. No. 11/951,500, filed Dec. 6, 2007, Office Action mailed Sep. 22, 2009, 24 pages.
U.S. Appl. No. 11/951,500, filed Dec. 6, 2007, Final Office Action mailed Mar. 30, 2010, 26 pages.
U.S. Appl. No. 11/877,129, filed Oct. 23, 2007, Office Action mailed Sep. 28, 2009, 15 pages.
U.S. Appl. No. 11/877,129, filed Oct. 23, 2007, Final Office Action mailed Mar. 29, 2010, 17 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Advisory Action mailed Apr. 16, 2010, 3 pages.
U.S. Appl. No. 12/019,299, filed Jan. 24, 2008, Office Action mailed Mar. 31, 2010, 13 pages.
International Search Report and Written Opinion of PCT/US2010/037074 mailed Jun. 1, 2011, 16 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Final Office Action mailed Apr. 14, 2011, 33 pages.
U.S. Appl. No. 11/024,160, filed Dec. 27, 2004, Final Office Action dated Jun. 1, 2011, 11 pages.
U.S. Appl. No. 12/019,335, filed Jan. 24, 2008, Office Action mailed May 23, 2011, 18 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
U.S. Appl. No. 11/024,160, filed Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Browser Architecture. Overview on the support of multi-modal browsers in 3GPP, IBM Research Mobile Speech Solutions and Conversational Multi-modal Computing, downloaded on May 26, 2003, 25 pages.
Maes, Stephanie, Multi-modal Web IBM Position W3C/WAP Workshop, IBM Research Human Language Technologies, on May 26, 2003, 9 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded on Aug. 2, 2004, 4 pages.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual on May 26, 2003, 5 pages.

Sundsted, Todd E., with Liberty and single sign-on for all, The Liberty Alliance Project seeks to solve the current online identity crisis Java World, downloaded on May 26, 2003, 7 pages.

Thomas Manes, Anne, "Registering a Web Service in UDDI", 2003.

U.S. Appl. No. 11/848,347, filed Aug. 31, 2007, Final Office Action mailed May 10, 2010, 15 pages.

U.S. Appl. No. 11/877,129, filed Oct. 23, 2007, Advisory Action mailed Jun. 3, 2010, 2 pages.

U.S. Appl. No. 11/926,738, filed Oct. 29, 2007, Final Office Action mailed Jun. 29, 2010, 12 pages.

U.S. Appl. No. 11/951,500, filed Dec. 6, 2007, Advisory Action mailed Jun. 24, 2010, 2 pages.

U.S. Appl. No. 10/855,999, filed May 28, 2004, Office Action dated Jun. 24, 2010, 20 pages.

U.S. Appl. No. 10/855,999, filed May 28, 2004, Advisory Action dated Feb. 16, 2010, 3 pages.

U.S. Appl. No. 10/855,999, filed May 28, 2004, Advisory Action dated Feb. 2, 2009, 3 pages.

U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.

U.S. Appl. No. 10/855,999, filed May 28, 2004, Office Action dated Apr. 15, 2009, 13 pages.

U.S. Appl. No. 10/855,999, filed May 28, 2004, Office Action dated May 1, 2008, 9 pages.

U.S. Appl. No. 11/070,317, filed Mar. 1, 2005, Advisory Action dated May 19, 2009, 3 pages.

U.S. Appl. No. 11/070,317, filed Mar. 1, 2005, Final Office Action dated Feb. 2, 2010, 8 pages.

U.S. Appl. No. 11/070,317, filed Mar. 1, 2005, Final Office Action dated Mar. 4, 2009, 16 pages.

U.S. Appl. No. 11/070,317, filed Mar. 1, 2005, Office Action dated Apr. 30, 2010, 9 pages.

U.S. Appl. No. 11/070,317, filed Mar. 1, 2005, Office Action dated Aug. 18, 2009, 21 pages.

U.S. Appl. No. 11/070,317, filed Mar. 1, 2005, Office Action dated Aug. 5, 2008, 18 pages.

U.S. Appl. No. 11/130,636, filed May 16, 2005, Office Action dated Mar. 23, 2010, 6 pages.

U.S. Appl. No. 11/130,636, filed May 16, 2005, Office Action dated Sep. 18, 2009, 13 pages.

U.S. Appl. No. 12/045,220, filed Mar. 10, 2008, Advisory Action dated Jun. 11, 2010, 3 pages.

U.S. Appl. No. 12/045,220, filed Mar. 10, 2008, Final Office Action dated Apr. 2, 2010, 19 pages.

U.S. Appl. No. 12/045,220, filed Mar. 10, 2008, Office Action dated Oct. 2, 2009, 18 pages.

Burger, E. et al., "Deploying CCXML for Application-Layer Call Control," Aug. 2006, 11 pages.

Kim et al., "Implementation of Third Party Based Call Control using Parlay Network API in SIP Environment," ICOIN 2003, LNCS 2662, 2003, pp. 416-425.

Romellini, C. et al., "CCXML: The Power of Standardization," Loquendo, Sep. 27, 2005.

U.S. Appl. No. 11/848,347, filed Aug. 31, 2007, Advisory Action mailed Jul. 27, 2010, 3 pages.

U.S. Appl. No. 11/848,347, filed Aug. 31, 2007, Office Action mailed Sep. 30, 2010, 19 pages.

U.S. Appl. No. 11/877,129, filed Oct. 23, 2007, Notice of Allowance mailed Aug. 5, 2010, 6 pages.

U.S. Appl. No. 11/943,101, filed Nov. 20, 2007, Office Action mailed Aug. 27, 2010, 11 pages.

U.S. Appl. No. 11/951,500, filed Dec. 6, 2007, Office Action mailed Sep. 1, 2010, 30 pages.

U.S. Appl. No. 12/019,299, filed Jan. 24, 2008, Final Office Action mailed Oct. 6, 2010, 20 pages.

U.S. Appl. No. 10/856,588, filed May 28, 2004, Advisory Action dated Jan. 5, 2010, 3 pages.

U.S. Appl. No. 10/856,588, filed May 28, 2004, Final Office Action dated Oct. 15, 2008, 11 pages.

U.S. Appl. No. 10/856,588, filed May 28, 2004, Final Office Action dated Oct. 20, 2009, 17 pages.

U.S. Appl. No. 10/856,588, filed May 28, 2004, Notice of Allowance dated Sep. 23, 2010, 8 pages.

U.S. Appl. No. 10/856,588, filed May 28, 2004, Office Action dated Mar. 16, 2009, 10 pages.

U.S. Appl. No. 10/856,588, filed May 28, 2004, Office Action dated Apr. 11, 2008, 16 pages.

U.S. Appl. No. 11/024,160, filed Dec. 27, 2004, Advisory Action dated Feb. 18, 2010, 3 pages.

U.S. Appl. No. 11/024,160, filed Dec. 27, 2004, Final Office Action dated Oct. 15, 2010, 11 pages.

U.S. Appl. No. 11/024,160, filed Dec. 27, 2004, Final Office Action dated Dec. 3, 2009, 11 pages.

U.S. Appl. No. 11/024,160, filed Dec. 27, 2004, Final Office Action dated Feb. 11, 2009, 9 pages.

U.S. Appl. No. 11/024,160, filed Dec. 27, 2004, Office Action dated Jun. 29, 2009, 9 pages.

U.S. Appl. No. 11/024,160, filed Dec. 27, 2004, Office Action dated Jun. 9, 2010, 10 pages.

U.S. Appl. No. 11/024,160, filed Dec. 27, 2004, Office Action dated Aug. 22, 2008, 8 pages.

U.S. Appl. No. 11/070,317, filed Mar. 1, 2005, Final Office Action dated Sep. 27, 2010, 8 pages.

U.S. Appl. No. 11/123,468, filed May 5, 2005, Advisory Action dated Feb. 17, 2010, 3 pages.

U.S. Appl. No. 11/123,468, filed May 5, 2005, Final Office Action dated Nov. 24, 2009, 19 pages.

U.S. Appl. No. 11/123,468, filed May 5, 2005, Office Action dated Apr. 10, 2009, 17 pages.

U.S. Appl. No. 11/123,468, filed May 5, 2005, Office Action dated Apr. 14, 2010, 16 pages.

U.S. Appl. No. 11/123,468, filed May 5, 2005, Final Office Action dated Nov. 10, 2010, 18 pages.

U.S. Appl. No. 11/123,471, filed May 5, 2005, Notice of Allowance dated Jun. 29, 2009, 6 pages.

U.S. Appl. No. 11/123,471, filed May 5, 2005, Office Action dated Jan. 23, 2009, 8 pages.

U.S. Appl. No. 11/130,636, filed May 16, 2005, Notice of Allowance mailed Aug. 18, 2010, 4 pages.

U.S. Appl. No. 11/939,705, filed Nov. 14, 2007, Office Action mailed Oct. 4, 2010, 21 pages.

Author Unknown, "Assuring Quality of Experience for IPTV—White Paper," Heavy Reading, Jul. 2006, 18 pages.

Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.

Dhesikan, "Quality of Service for IP Videoconferencing—Engineering White Paper," Cisco Systems, Jun. 1, 2001, 16 pages.

U.S. Appl. No. 11/926,738, filed Oct. 29, 2007, Notice of Allowance mailed Aug. 5, 2011, 13 pages.

U.S. Appl. No. 11/943,101, filed Nov. 20, 2007, Office Action mailed Jul. 28, 2011, 11 pages.

U.S. Appl. No. 11/943,101, filed Nov. 20, 2007, Notice of Allowance mailed Dec. 9, 2011, 7 pages.

U.S. Appl. No. 11/951,500, filed Dec. 6, 2007, Advisory Action mailed Jul. 15, 2011, 3 pages.

U.S. Appl. No. 11/024,160, filed Dec. 27, 2004, Notice of Allowance dated Aug. 4, 2011, 15 pages.

U.S. Appl. No. 11/939,705, filed Nov. 14, 2007, Office Action mailed Sep. 28, 2011, 15 pages.

U.S. Appl. No. 12/045,220, filed Mar. 10, 2008, Office Action dated Sep. 27, 2011, 20 pages.

U.S. Appl. No. 12/019,335, filed Jan. 24, 2008, Final Office Action mailed Dec. 5, 2011, 19 pages.

U.S. Appl. No. 12/364,642, filed Feb. 3, 2009, Final Office Action dated Jul. 1, 2011, 20 pages.

U.S. Appl. No. 12/364,642, filed Feb. 3, 2009, Advisory Action dated Sep. 16, 2011, 3 pages.

U.S. Appl. No. 12/364,642, filed Feb. 3, 2009, Office Action dated Oct. 18, 2011, 21 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Notice of Allowance mailed Aug. 22, 2011, 8 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.

\* cited by examiner

CALL CONTROL ENABLER ABSTRACTED FROM UNDERLYING NETWORK TECHNOLOGIES

CROSS-REFERENCES TO RELATED APPLICATIONS

This application claims the benefit of U.S. Provisional Application No. 60/896,676, filed Mar. 23, 2007 by Maes and entitled "Call Control Driven MVC Programming Model for Mixing Web and Call or Multimedia Applications," of which the entire disclosure is incorporated herein by reference.

BACKGROUND OF THE INVENTION

Embodiments of the present invention relate generally to methods and systems for providing control of a call or other communication session and more particularly to a call control enabler for abstracting underlying network technologies.

Various methods and systems have been established for providing control of a call or other electronic communication session and control of media within that call, such as provided by an Interactive Voice Response (IVR) system for example. Furthermore, different standards and proprietary programming models are being established to support description of call control, description of signaling, and description of dialog systems. For example, call control can be achieved with Parlay X or other high level APIs on legacy networks (with Parlay Gateways) and/or even Call Control eXtensible Markup Language (CCXML) on Session Initiation Protocol (SIP) for example. Call controllers can be realized in SIP (e.g. SIP Servlet container as described in Java Specification Request (JSR) 116), as APIs/interfaces to Parlay Gateways/Service Capability Servers (SCSs) or against other Public Switched Telephone Network (PSTN), Internet (IN) or other legacy network resources (e.g. AXE, Switches, etc.). Signaling may be done in SIP, H323, IN (e.g., Transaction Capabilities Application Part (TCAP), Intelligent Network Application Part (INAP), Customized Applications for Mobile Network Enhanced Logic (CAMEL), Medium Access Control protocol, Signaling System 7 (SS7), Java Telephony Application Program Interface (JTAPI), Telephony Application Program Interface (TAPI), IN, etc. Public Branch exchanges (PBXes) and IP PBXes may also perform call control functions and interface via TAPI, TAPI, etc. or through PBX IP Media Gateway (PIMG). Generally speaking, these call controllers can route an incoming call or media session to another module or processor such as a dialog server to support the session, receive notifications of calls and react by determining how to handle (i.e. how to route), and initiate a call or multimedia session between one or multiple parties.

However, these existing call controllers are limited in that they do not factor out or abstract the underlying network technologies. That is, the existing solutions are either limited to use with only one network technology (e.g. Parlay SCS/GW or SIP only; (IP)PBXes) or do not allow integration with other capabilities (e.g., SIP servlet can't really integrate with SOA or other applications/capabilities today). Hence, there is a need for improved methods and systems for controlling a media session such as a call or other media exchange.

BRIEF SUMMARY OF THE INVENTION

Embodiments of the invention provide systems and methods for controlling a media session such as a call or other media exchange. According to one embodiment, a method for controlling a communication session can comprise receiving a request to perform a call control function from an application via a northbound interface of a call control enabler. For example, the northbound interface of the call control enabler can comprise an interface (e.g. an Application Program Interface (API)) such as a Parlay call control API. The northbound interface can provide an abstract interface for invoking one or more of a plurality of call control functions, e.g., call control or multimedia call control in third party or multi party mode as well as call notification and Conference Call Control (CCC). For example, the one or more call control functions can comprise establishing a connection with a second network resource. Establishing the connection with the second network resource can be performed via a call control function of the first network resource, via a third-party call control function of the first network resource, via a multi-party call control function of the first network resource, etc.

The call control function can be requested from a first network resource via a southbound interface of the call control enabler. The southbound interface can provide an interface specific to the first network resource. For example, the southbound interface can comprise a Session Initiation Protocol (SIP) interface, a Public Switched Telephone Network (PSTN) interface, a Parlay interface, a Public Branch Exchange (PBX) interface, an Internet Protocol Network (IN) interface, an IP Media Gateway (IMG) interface, AXE, CAP, TCAP, INAP, CAMEL, MAP, SS7, TAPI, JTAPI, etc.

In some cases, results of the call control function can be received from the first network resource via the southbound interface of the call control enabler. The results of the call control function can then be returned to the application via the northbound interface of the call control enabler. Additionally or alternatively, one or more applications can be notified of the call or session and/or information related to the call session including but not limited to the parties or endpoints involved, types of media involved, etc.

According to another embodiment, a call control enabler can comprise an abstraction layer including one or more northbound interfaces. For example, the northbound interface of the call control enabler can comprise an Application Program Interface (API) such as a Parlay call control API. The northbound interface can provide an abstract interface for providing notification of network events and invoking one or more of a plurality of call control functions. For example, the one or more call control functions can comprise establishing a connection with a second network resource. Establishing the connection with the second network resource can be performed via a call control function of the first network resource, via a third-party call control function of the first network resource, via a multi-party call control function of the first network resource, etc. The call control enabler can be adapted to receive a request to perform a call control function of the first network resource from an application via the northbound interface. The call control enabler can also be adapted to provide notification of requests or other events to an application via the northbound interface.

The call control enabler can also comprise one or more enabler instances. Each of the one or more enabler instances can provide a southbound interface specific to the first network resource. For example, the southbound interface can comprise a Session Initiation Protocol (SIP) interface, a Public Switched Telephone Network (PSTN) interface, a Parlay interface, a Public Branch Exchange (PBX) interface, an Internet Protocol Network (IN) interface, an IP Media Gateway (IMG) interface, AXE, CAP, TCAP, INAP, CAMEL, MAP, SS7, TAPI, JTAPI, etc. The call control enabler can be further adapted to request the call control function of the first network resource via the southbound interface. In some cases, the call control enabler can be further adapted to receive results of the call control function from the first network resource via the southbound interface of the call control enabler and return the results of the call control function to the application via the northbound interface of the call control enabler.

According to yet another embodiment, a machine-readable medium can have stored thereon a series of instructions which, when executed by a processor, cause the processor to perform call control by receiving a request to perform a call control function from an application via a northbound interface of a call control enabler. For example, the northbound interface of the call control enabler can comprise an Application Program Interface (API) such as a Parlay call control API. The northbound interface can provide an abstract interface for invoking one or more of a plurality of call control functions. For example, the one or more call control functions can comprise establishing a connection with a second network resource. Establishing the connection with the second network resource can be performed via a call control function of the first network resource, via a third-party call control function of the first network resource, via a multi-party call control function of the first network resource, etc.

The call control function can be requested from a first network resource via a southbound interface of the call control enabler. In some cases, results of the call control function can be received from the first network resource via the southbound interface of the call control enabler. The results of the call control function can then be returned to the application via the northbound interface of the call control enabler.

According to still another embodiment, a method of controlling a communication session can comprise receiving a request to affect a communication session from an endpoint via a southbound interface of a call control enabler, the southbound interface providing an interface specific to the endpoint. An application can be notified of the request via a northbound interface of the call control enabler, the northbound interface providing an abstract interface for invoking one or more of a plurality of call control functions. The method can also include determining with the application one or more call control functions to be performed in response to the request and requesting the one or more call control functions with the application via the northbound interface of the call control enabler. The request to perform the one or more call control functions can be received from the application via the northbound interface of the call control enabler and the call control function can be requested from a network resource via a southbound interface of the call control enabler, the southbound interface providing an interface specific to the first network resource.

DETAILED DESCRIPTION OF THE INVENTION

Figure 1:
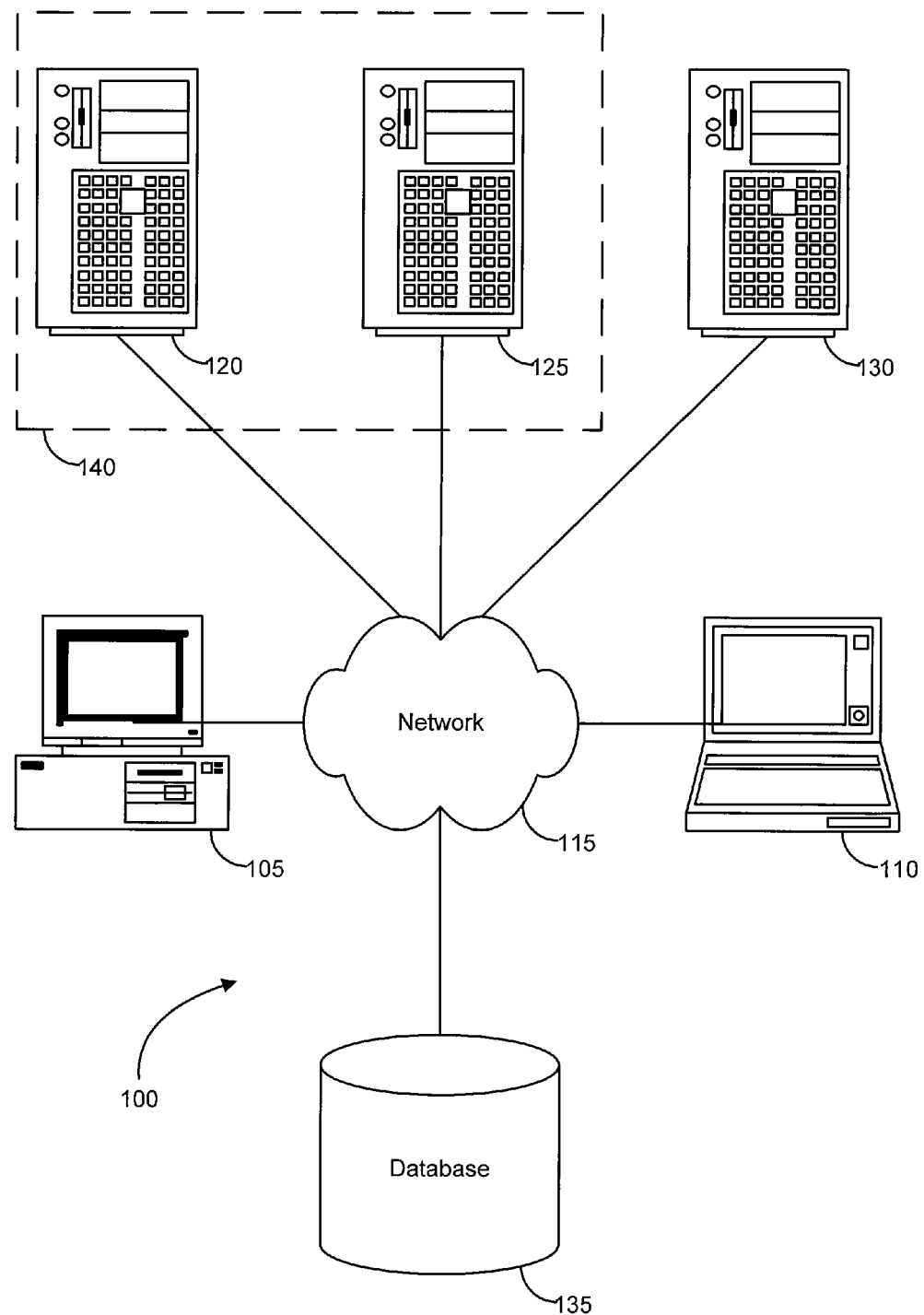
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for controlling a communication session such as a call or other media exchange. More specifically, embodiments of the present invention include a call control enabler for invoking or interacting with various call control functions in a way that is abstracted from the underlying network technologies supporting the call or other media exchange. As used herein, the term enabler refers to a reusable service layer component or components that provide an intrinsic function for use by others (other enablers, applications (i.e. services) or any authorized resource) through appropriate northbound interfaces. Intrinsic means that an enabler does not itself provide functions provided by other enablers nor functions based on service provider policies (e.g. messaging does not include authentication, charging, logging, etc.). These functions may be implemented by network resources, devices or OSS/BSS functions. An enabler accesses these resources and/or functions via any mechanism appropriate for the resource. That is, a southbound interface is not specified as part of the adapter, so it can be changed from resource to resource. However, northbound interfaces provided by an enabler may be standardized.

As will be described in detail below, a call control enabler according to embodiments of the present invention can provide a northbound interface for invoking one or more of a plurality of call control functions of a network resource and/or providing notification of calls and/or events. The northbound interface represents an abstraction of the functions of the network resource. Additionally, the call control enabler can provide a southbound interface that is specific to interfaces and/or protocols of the network resource. Therefore, the call control enabler can receive a request to perform a call control function of the network resource from an application via the northbound interface and in turn request the call control function from the network resource via the southbound interface. In this way, the applications using the call control enabler to interact with the network resource need not be aware of the interfaces and/or protocols used by the network resource. Rather, the applications can interact with the call control enabler via the abstracted northbound interface.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g. the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
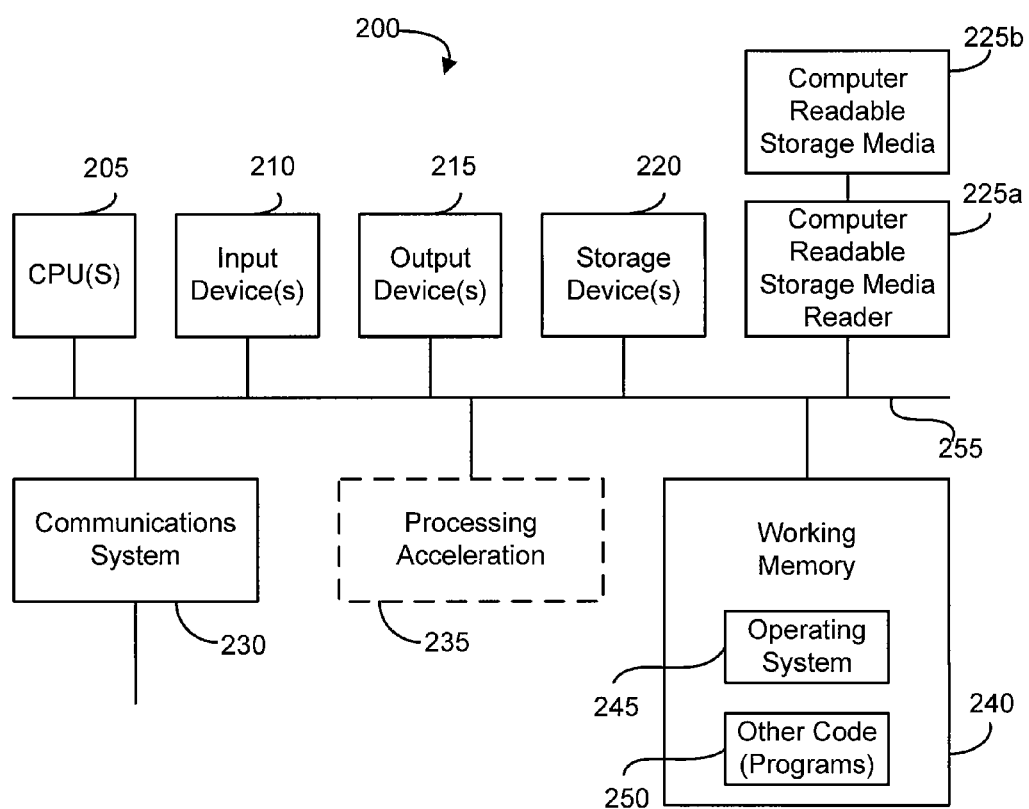
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
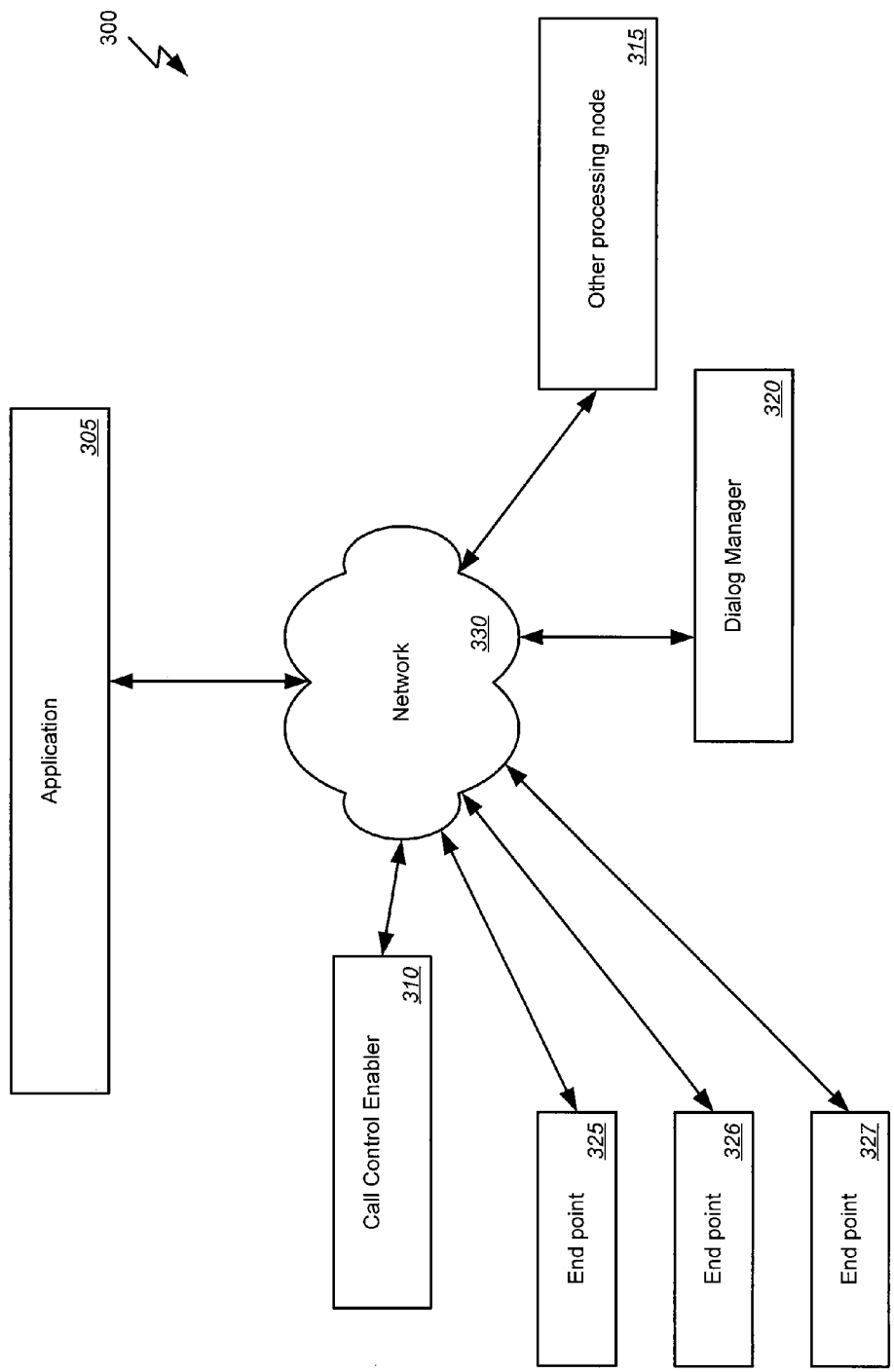
FIG. 3 is a block diagram illustrating, at a high-level, functional components of a system for providing call control according to one embodiment of the present invention.

FIG. 3 is a block diagram illustrating, at a high-level, functional components of a system for providing call and dialog control according to one embodiment of the present invention. Such a system 300 is also described in U.S. patent application Ser. No. 11/848,347 filed Aug. 31, 2007 by Maes and entitled "Factoring Out Dialog Control and Call Control" of which the entire disclosure is incorporated herein by reference for all purposes. In this example, a system 300 for performing call control can comprise a communications network 330, a call control enabler 310, a dialog manager 320, and/or another media processing node 315 communicatively coupled with the communications network 330. The media processing node 315 can comprise, for example, a media server and/or a media server control enabler such as described in U.S. patent application Ser. No. 11/877,129 filed Oct. 23, 2007 by Maes and entitled "Network Agnostic Media Server Control Enabler" of which the entire disclosure is incorporated herein by reference for all purposes.

An initiating device or endpoint 325 can be communicatively coupled with the communications network 330. The initiating endpoint 325 can be adapted to initiate a communication session over the communications network 330 via a signaling protocol, such as, for example, SIP. However, as noted above, in other implementations other protocols and/or interfaces can be used including but not limited to a Public Switched Telephone Network (PSTN) interface, a Parlay interface, a Public Branch Exchange (PBX) interface, an Internet Protocol Network (IN) interface, an IP Media Gateway (IMG) interface, AXE, CAP, TCAP, INAP, CAMEL, MAP, SS7, TAPI, JTAPI, etc. Generally speaking, the initiating endpoint 325 can be put in communication with either another endpoint 326, multiple other endpoints 326 and 327 or a processing systems like a dialog manager 320 or other media processing node 315.

As described here, signaling is separated from the media exchanges. However, as can be understood by one skilled in the art, such separation is not required. Rather, embodiments of the present invention can also be implemented in cases where the signaling and media exchanges are combined. That is, the call control can be performed either on the signaling and the media exchanged can follow a different path once the signaling describes that path or can be done in cases where the signaling and media are together.

The application 305 can receive and process a notification of the communication. In other cases, rather than reacting to a communication from the initiating device or endpoint 325, the application 305 may initiate the communication with the endpoint 325. In some cases, based on the application logic, the application 305 can perform call control. According to one embodiment, the application 305 can perform call control by requesting functions provided by a call control enabler 310 for interacting with other elements of the system 300. That is, the call control enabler 310 shown here can be issued or invoked by the application 305 to drive what is done to the call/media session. In yet other implementations, the call control enabler 310 may be preconfigured to react to a call or communication and notify the application 305 of the communication and/or information related to the communication such as the parties involved, the media exchanged, the state of the communication, the call control functions performed, etc.

Thus, it should be understood that a call may be handled or initiated in different ways. A call may be initiated by the call control enabler 310, for example, in response to the application 305 determining how to setup a call between parties, endpoints, and/or processors and requesting call control from the call control enabler 310, for example to invite the parties or otherwise initiate the call. In another case, call control may be performed as a result of a call initiated by an endpoint 325. For example, a caller, e.g. an endpoint 325, can call the call control enabler 310 which in turn notifies the application 305. The application 305 can in turn decide how to react, e.g., determines other parties to invite or other call control functions to perform and requests these functions from the call control enabler 310. The call control enabler 310 can in turn respond by establishing the call or performing the functions requested by the application 305. In yet another example, the call control enabler 310 can be called upon to act on an existing call to, for example, query the state of the call or session and/or modify it.

The call control enabler 310 can be adapted to receive a request to perform call control functions from the application 305, for example via the signaling protocol. Receiving a request to perform call control functions from the initiating endpoint 325 via the signaling protocol can comprise, for example, receiving the request via an Application Program Interface (API) of a call control enabler 310 such as, for example, the exemplary call control enabler described below with reference to FIG. 4, and exposing, for example, a Parlay Call Control API (JR—Java Realization, SCF (Service Capability Function) or Parlay X—WS). The call control enabler 310 can then perform the requested call control function itself or request the function from another network resource. For example, the call control enabler 310 can provide call control in third-party or multi-party mode for voice or multimedia. This control can be provided independently of the underlying network technology.

Via the call control enabler 310, the application 305 can maintain control of the call and request execution of a dialog by the dialog manager 320 or other media processing (e.g. media server) by another processing node 315. For example, the one or more call control functions provided by the call control enabler 310 can include establishing a connection with a second network resource such as the dialog manager 320 or another media processing node 315. The dialog manager 320 or other media processing node can be adapted to support and/or provide any of a number of different functions or services including but not limited to dialog management, conferencing, media server control, etc. As noted above, establishing the connection with the second network resource can be performed via a third-party call control function, via a multi-party call control function, etc.

Therefore, the application 305 can interact with the call or communication session through the call control enabler 310 to either direct the signaling or direct a network resource to direct the signaling (and/or media). The application 305 can initiate the call or react to a call (by receiving an event like a call notification and reacting thereto). As noted, the communication session can be any media or multimedia session and are not limited to voice calls. Rather, the communication session can be video, IM, voice with video, or any other media exchange. Furthermore, it should be noted that when describing the application and/or call control enabler reacting to events, it is contemplated that the events can be other than call notification. For example, in other implementations other events like mid-call events or call termination notifications etc may be provided. While one application may be aware of these because it is driving the call control, other applications may register and listen for these events.

Figure 4:
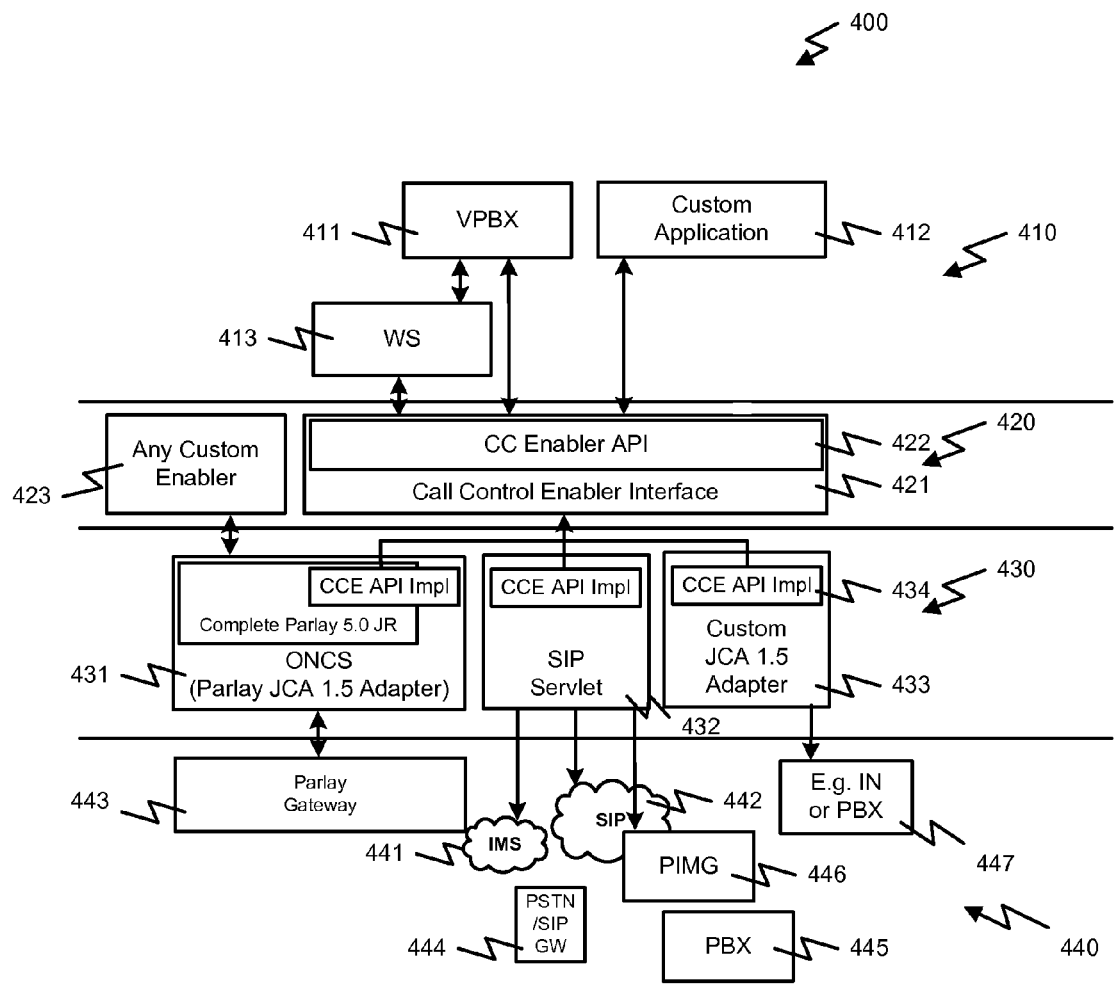
FIG. 4 is a block diagram illustrating details of a call control enabler according to one embodiment of the present invention.

FIG. 4 is a block diagram illustrating details of a call control enabler according to one embodiment of the present invention. In this example, the implementation of the call controller is divided into a number of logical layers including, but not limited to, a layer of applications 410, a layer comprising one or more abstract call control enablers 420, a layer comprising specific call control enabler instances 430 or implementations, and a network layer 440. Generally speaking, the application layer 410 can comprise any of a number of specific applications that may interface and/or interact with the call control enablers 420 and 430. For example, the applications can include, but are not limited to, a java application, a web service 413, a Virtual Public Branch exchange (VPBX), a VoIP residential, a PBX or intranet VoIP application, a confernec application, a Voice mail or unified messaging application, a VCC (Voice Continuity) applications and/or any number of custom applications 412, etc. According to one embodiment, the call controller 400 can be implemented according to the embodiments described in U.S. application Ser. No. 11/951,500 filed Dec. 6, 2007 by Maes and entitled "Achieving Low Latencies on network events in a Non-Realtime Platform", the entire disclosure of which is incorporated herein by reference for all purposes.─┤─

The abstract call control enabler layer 420 can include, but is not limited to, any of a number of custom enablers 423 that can comprise any reusable function built on the call controller. For example, the abstract call control enabler layer 420 can provide a call forward widget, a call barring widget, a legal intercept widget etc. The abstract call control enabler layer 420 can also include one or more call control enabler interfaces 421 to functions including but not limited to multiparty call control, third party call control, media type setup, call notification, mid-call events, other call events, registration to call events etc. Generally speaking, the call control enabler interfaces 421 according to one embodiment can provide high-level Application Program Interfaces (APIs) 422. Via the APIs 422, applications 410 can call or invoke various functions or features of the call control enabler. For example, the APIs 422 provided by the abstract call control enabler layer 420 can include, but is not limited to, APIs for call creation, call forwarding and/or redirection, call handling and conferencing, adding multiple parties to a call, call notifications, etc. Upon invocation by an application 410 via the API 422, one or more instances of the call control enabler may be instantiated. That is, one or more call control enabler instances can be created for specific call control enabler implementations based on the request from the applications 410 via the API 422.

The individual call control enabler instances 430 can be implemented in many ways to perform various functions and provide adapters to network resources. For example, the call control enabler instances 430 can include a instances 431 for interfacing or adapting to Parlay based resources. Such instances can provide, for example, Java J2EE Connector Architecture (JCA1.5) adapters to a Parlay gateway (GW) 443 JCA adapters to IN GWor PBX 447, and/or JCA adapter 433 to anything else that does call control/routing. In another example, the call control enabler instances 430 can include a Session Initiation Protocol (SIP) servlet providing an interface to IP Multimedia Subsystem (IMS) 441, SIP internet, or other SIP deployments. In such cases, SIP may be driving a PBX-IP Media Gateway (PIMG) 446 to drive PBXs 445, a SIP to PSTN GW 444, or others connected with a SIP network 442.

Thus, the northbound interface 421 of the call control enabler 400 can provide an abstract interface for invoking one or more of a plurality of call control functions. For example, the one or more call control functions can comprise establishing a connection with a second network resource such as the dialog manager or another media processing node as described above with reference to FIG. 3. Establishing the connection with the second network resource can be performed via a call control function, e.g., third-party call control multi-party call control, etc., of a first network resource such as the Parlay gateway 443, SIP GW 444, PBX 445, PIMG 446, etc.

The call control enabler 400 can be adapted to receive a request to perform a call control function of the first network resource from the application 412 via the northbound interface 422 and request the call control function of the first network resource via the appropriate southbound interface or adapter 431-433. In some cases, the call control enabler 400 can be further adapted to receive results of the call control function from the first network resource via the southbound interface or adapter 431-433 and return the results of the call control function to the application 412 via the northbound interface 422.

As noted above, a call may be handled or initiated by the call control enabler 310 in different ways. A call may be initiated by the call control enabler 400, for example, in response to an application determining how to setup a call between parties, endpoints, and/or processors and requesting call control from the call control enabler 400. In another case, call control may be performed as a result of a call initiated by an endpoint. For example, a caller or initiating endpoint can call the call control enabler 400 which in turn notifies an application. In yet another example, the call control enabler 400 can be called upon to act on an existing call to, for example, query the state of the call or session and/or modify it.

Furthermore, it should be understood that the call control enabler, while performing call control functions, also identifies the call legs or media session legs and the involved endpoints. The call control enabler can then associate cerate calls by creating or changing legs from one endpoint to another, being notified of incoming legs from an endpoint targeting another endpoint(s) or be able to query status of a leg and modify its endpoint or add legs/endpoints to a session.

Figure 5:
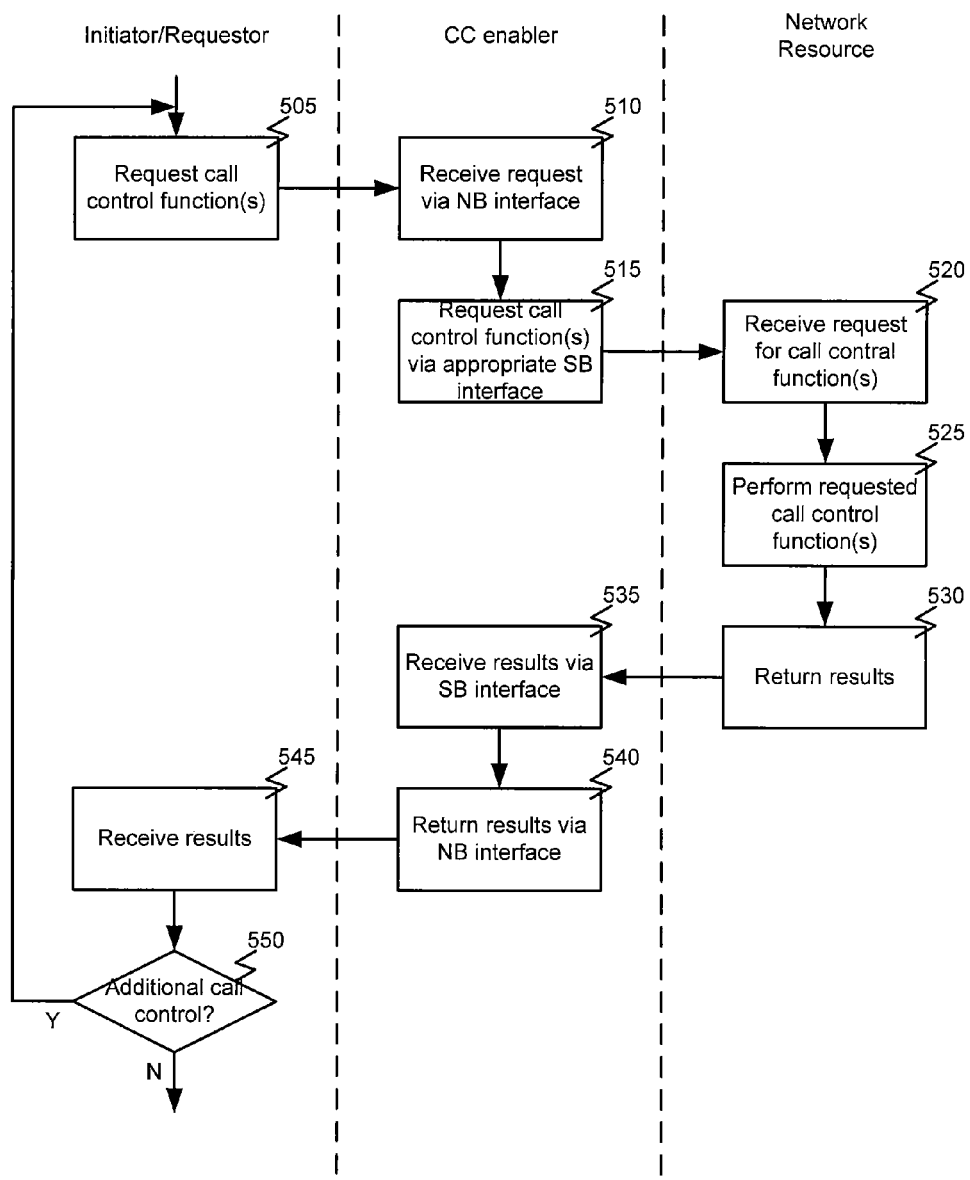
FIG. 5 is a flowchart illustrating a process for performing call control according to one embodiment of the present invention.

FIG. 5 is a flowchart illustrating a process for performing call control according to one embodiment of the present invention. In this example, processing begins with the application requesting 505 one or more call control functions via the abstract northbound interface of the call control enabler. The call control enabler receives 510 the request to perform a call control function from the application via the northbound interface of the call control enabler. As noted above, the request can comprise, for example a request to initiate a call or session, affect a call or session (e.g., terminate, add a party, etc.), determine and/or update a state of the call or session, etc. The call control function can in turn be requested 515 by the call control enabler from a network resource via a southbound interface of the call control enabler.

The network resource can receive 520 the request from the call control enabler and perform 525 the requested call control function. As noted above, the call control functions of the network resource that can be invoked or accessed through the northbound interface can include, but are not limited to, establishing a connection with a second network resource. Establishing the connection with the second network resource can be performed via a call control function of the first network resource, via a third-party call control function of the first network resource, via a multi-party call control function of the first network resource, etc. Furthermore, as noted above, performing 525 the call control functions can include the network resource generating results of the function, collecting information from the user, or detecting events. Therefore, the network resource can return 530 such results or events to the call control enabler via the southbound interfaces of the call control enabler.

The call control enabler can receive 535 the results of the call control function from the network resource via the southbound interface of the call control enabler and return 540 the results of the call control function to the application via the northbound interface of the call control enabler. The application can in turn receive 545 the results from the call control enabler via the northbound interface of the call control enabler and determine 550 whether to perform additional call control functions. If a determination 550 is made to perform addition call control functions, the application can again request 505 the call control functions via the northbound interface of the call control enabler.

Figure 6:
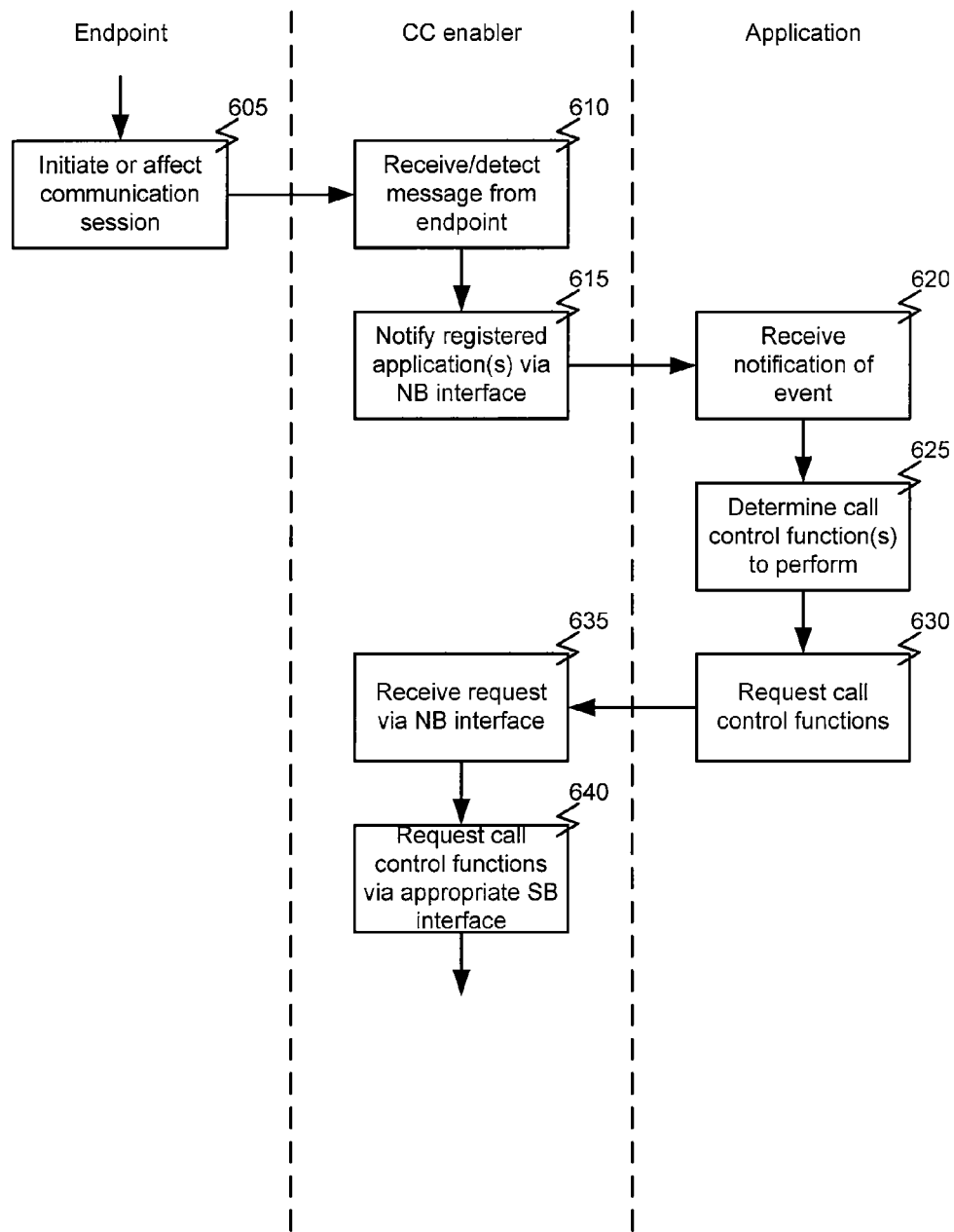
FIG. 6 is a flowchart illustrating a process for performing call control according to an alternative embodiment of the present invention.

FIG. 6 is a flowchart illustrating a process for performing call control according to an alternative embodiment of the present invention. As noted above, a call or media session can also be initiated by an endpoint, i.e., other than an application. In such a case, the process can begin with the endpoint initiating 605 or affecting a call or media session, for example, via a message of a signaling protocol. The call control enabler detects 610 the communication, i.e., receives the message, from the endpoint via the southbound interface of the call control enabler. As noted above, the request can comprise, for example a request to initiate a call or session, affect a call or session (e.g., terminate, add a party, etc.), determine and/or update a state of the call or session, etc.

The call control enabler can in turn notify 615 one or more registered applications via the northbound interface of the call control enabler. The application(s) can in turn receive 620 the notification of the request or event from the endpoint via the northbound interface of the call control enabler. In some cases, a controlling application can determine 625 one or more call control functions to be performed in response. As noted above, the call control functions of the network resource that can be invoked or accessed through the northbound interface can include, but are not limited to, establishing a connection with a one or more network resources, affecting a call or session (e.g., terminate, add a party, etc.), determine and/or update a state of the call or session, etc.

Once the call control function(s) have been determined 625 by the application, the application can request 630 one or more call control functions via the abstract northbound interface of the call control enabler. The call control enabler receives 635 the request to perform a call control function from the application via the northbound interface of the call control enabler. The call control function can in turn be requested 640 by the call control enabler from a network resource via a southbound interface of the call control enabler.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for controlling a communication session, the method comprising:

receiving a request to perform a call control function of a first network resource of a plurality of network resources from an application via a northbound interface of a call control enabler, the northbound interface providing an abstract, network agnostic interface providing notification of network events and for invoking one or more of a plurality of call control functions of the first network resource for affecting, determining, or updating a state of the communication session based on the request, wherein the call control enabler is between the application and the first network resource and wherein the application interacts with the first network resource through the call control enabler; and requesting the call control function from the first network resource via a southbound interface of an enabler instance of a plurality of enabler instances of the call control enabler, each of the plurality of enabler instances providing the southbound interface providing an interface specific to one of the network resources regardless of a network or protocol of the northbound interface.

2. The method of claim 1, further comprising:

receiving results of the call control function from the first network resource via the southbound interface of the call control enabler; and returning the results of the call control function to the application via the northbound interface of the call control enabler.

3. The method of claim 1, wherein the northbound interface of the call control enabler comprises an Application Program Interface (API).

4. The method of claim 3, wherein the northbound interface comprises a Parlay call control API.

5. The method of claim 1, wherein the one or more call control functions comprise establishing a connection with a second network resource.

6. The method of claim 5, wherein establishing the connection with the second network resource is performed via a call control function of the first network resource.

7. The method of claim 5, wherein establishing the connection with the second network resource is performed via a third-party call control function of the first network resource.

8. The method of claim 5, wherein establishing the connection with the second network resource is performed via a multi-party call control function of the first network resource.

9. The method of claim 1, wherein the one or more call control functions comprise determining a state of an existing call.

10. The method of claim 1, wherein the one or more call control functions comprise modifying a state of an existing call.

11. The method of claim 1, wherein the southbound interface comprises a Session Initiation Protocol (SIP) interface.

12. The method of claim 1, wherein the southbound interface comprises a Public Switched Telephone Network (PSTN) interface.

13. The method of claim 1, wherein the southbound interface comprises a Parlay interface.

14. The method of claim 1, wherein the southbound interface comprises a Public Branch Exchange (PBX) interface.

15. The method of claim 1, wherein the southbound interface comprises an Internet Protocol Network (IN) interface.

16. The method of claim 1, wherein the southbound interface comprises an IP Media Gateway (IMG) interface.

17. A system comprising:

a processor; and a memory communicatively coupled with and readable by the processor and having stored therein instructions which, when executed by the processor, cause the processor to execute a call control enabler comprising an abstraction layer including one or more northbound interfaces providing an abstract, network agnostic interface for providing notification of network events and invoking one or more of a plurality of call control functions of a plurality of network resources, wherein the call control enabler is adapted to receive a request to perform a call control function of one of the network resources from an application via the northbound interface and a plurality of enabler instances for affecting, determining, or updating a state of the communication session based on the request, each of the plurality of enabler instances providing a southbound interface providing an interface specific to one of the network resources regardless of a network or protocol of the northbound interface, wherein the call control enabler is adapted to request the call control functions of one of the network resources via the southbound interface, wherein the enabler instance is between the plurality of network resources and the application and wherein the application interacts with the plurality of network resources through the call control enabler.

18. The system of claim 17, wherein the call control enabler is adapted to receive a request to perform a call control function of a first network resource of the plurality of network resources from the application via the northbound interface and request the call control function of the first network resource via the southbound interface of the enabler instance of the plurality of enabler instances which provides an interface specific to the first network resource.

19. The system of claim 18, wherein the call control enabler is further adapted to receive results of the call control function from the first network resource via the southbound interface of the enabler instance which provides an interface specific to the first network resource and return the results of the call control function to the application via the northbound interface of the call control enabler.

20. The system of claim 17, wherein the northbound interface of the call control enabler comprises an Application Program Interface (API).

21. The system of claim 20, wherein the northbound interface comprises a Parlay call control API.

22. The system of claim 17, wherein the one or more call control functions comprise establishing a connection with a second network resource.

23. The system of claim 22, wherein establishing the connection with the second network resource is performed via a call control function of the first network resource.

24. The system of claim 22, wherein establishing the connection with the second network resource is performed via a third-party call control function of the first network resource.

25. The system of claim 22, wherein establishing the connection with the second network resource is performed via a multi-party call control function of the first network resource.

26. The system of claim 17, wherein the southbound interface comprises a Session Initiation Protocol (SIP) interface.

27. The system of claim 17, wherein the southbound interface comprises a Public Switched Telephone Network (PSTN) interface.

28. The system of claim 17, wherein the southbound interface comprises a Parlay interface.

29. The system of claim 17, wherein the southbound interface comprises a Public Branch Exchange (PBX) interface.

30. The system of claim 17, wherein the southbound interface comprises an Internet Protocol Network (IN) interface.

31. The system of claim 17, wherein the southbound interface comprises an IP Media Gateway (IMG) interface.

32. The system of claim 17, wherein the call control enabler is further adapted to receive a request to affect a communication session from an endpoint via a southbound interface of a call control enabler and notify an application of the request via a northbound interface of the call control enabler.

33. The system of claim 32, wherein the application is adapted to determine one or more call control functions to be performed in response to the request and request the one or more call control functions via the northbound interface of the call control enabler.

34. The system of claim 33, wherein the call control enabler is further adapted to receive the request to perform the one or more call control functions from the application via the northbound interface of the call control enabler and request the call control function from a network resource via the southbound interface of the call control enabler.

35. A machine-readable memory having stored thereon a series of instructions which, when executed by a processor, cause the processor to perform call control by:
receiving a request to perform a call control function of a first network resource of a plurality of network resources from an application via a northbound interface of a call control enabler, the northbound interface providing an abstract, network agnostic interface providing notification of network events and for invoking one or more of a plurality of call control functions of the first network resource for affecting, determining, or updating a state of the communication session based on the request, wherein the call control enabler is between the application and the first network resource and wherein the application interacts with the first network resource through the call control enabler; and
requesting the call control function from the first network resource via a southbound interface of an enabler instance of a plurality of enabler instances of the call control enabler, each of the plurality of enabler instances of the southbound interface providing an interface specific to one of the network resources regardless of a network or protocol of the northbound interface.

36. The machine-readable memory of claim 35, further comprising:
receiving results of the call control function from the first network resource via the southbound interface of the call control enabler; and
returning the results of the call control function to the application via the northbound interface of the call control enabler.

37. The machine-readable memory of claim 35, wherein the northbound interface of the call control enabler comprises an Application Program Interface (API).

38. The machine-readable memory of claim 37, wherein the northbound interface comprises a Parlay call control API.

39. The machine-readable memory of claim 35, wherein the one or more call control functions comprise establishing a connection with a second network resource.

40. The machine-readable memory of claim 39, wherein establishing the connection with the second network resource is performed via a call control function of the first network resource.

41. The machine-readable memory of claim 39, wherein establishing the connection with the second network resource is performed via a third-party call control function of the first network resource.

42. The machine-readable memory of claim 39, wherein establishing the connection with the second network resource is performed via a multi-party call control function of the first network resource.

* * * * *

UNITED STATES PATENT AND TRADEMARK OFFICE
CERTIFICATE OF CORRECTION

PATENT NO.         : 8,230,449 B2                                   Page 1 of 1
APPLICATION NO.    : 11/949930
DATED              : July 24, 2012
INVENTOR(S)        : Maes It is certified that error appears in the above-identified patent and that said Letters Patent is hereby corrected as shown below:

On sheet 5 of 6, Reference Numeral 520, in figure 5, line 2, delete "contral" and insert -- control --, therefor.

In column 1, line 44, delete "exchanges" and insert -- eXchanges --, therefor.

In column 5, line 66, delete "(e.g." and insert -- (e.g., --, therefor.

In column 9, line 67, delete "exchange" and insert -- eXchange --, therefor.

In column 10, line 10, after "purposes." delete " -- t -- ".

Signed and Sealed this
Twenty-third Day of October, 2012

David J. Kappos
*Director of the United States Patent and Trademark Office*